United States Patent [19]

Durley, III

[11] 4,085,893
[45] Apr. 25, 1978

[54] ULTRASONIC HUMIDIFIERS, ATOMIZERS AND THE LIKE

[76] Inventor: Benton A. Durley, III, Rte. 45, Druce Lake, P.O. Box 304, Grayslake, Ill. 60030

[21] Appl. No.: 720,431

[22] Filed: Sep. 3, 1976

Related U.S. Application Data

[63] Continuation-in-part of Ser. No. 525,487, Mar. 20, 1974, abandoned.

[51] Int. Cl.² .............................................. B05B 17/06
[52] U.S. Cl. ...................................... 239/102; 239/121
[58] Field of Search ................... 239/4, 102, 121, 424; 116/137 A; 310/26

[56] References Cited

U.S. PATENT DOCUMENTS

| 1,958,406 | 5/1934 | Darrah ................................ 239/15 X |
| 3,114,654 | 12/1963 | Nishiyana et al. ................ 239/102 X |
| 3,214,101 | 10/1965 | Perron .................................. 239/102 |
| 3,243,122 | 3/1966 | Snaper ................................. 239/102 |
| 3,375,977 | 4/1968 | Butterworth et al. ............... 239/102 |
| 3,392,916 | 7/1968 | Engström et al. ................... 239/102 |

FOREIGN PATENT DOCUMENTS 1,302,016    1/1973    United Kingdom ................ 239/102

*Primary Examiner*—John J. Love
*Attorney, Agent, or Firm*—Burmeister, York, Palmatier, Hamby & Jones

[57] ABSTRACT

Devices are disclosed using ultrasonic vibratory energy for atomizing water, gasoline or other liquids, for use in humidifiers, carburetors, and the like. A humidifier or atomizer is disclosed comprising an ultrasonic transducer having a vibratory member, together with means for producing ultrasonic vibrations thereof, a liquid supply conduit for directing a liquid into contact with the vibratory member, and a collection receptacle disposed below the vibratory member for collecting the liquid when the ultrasonic transducer is not in operation. The ultrasonic transducer may comprise an elongated front end mass, an elongated tail mass, a pair of piezoelectric elements disposed between such masses, an electrode plate disposed between the piezoelectric elements, means for clamping such masses together, with the piezoelectric elements and the electrode plate therebetween, and a mounting member having an opening therein slidably receiving the piezoelectric elements and portions of such masses, the mounting member having an internal peripheral slot within such opening for slidably receiving the electrode plate. The opening and the slot having a sufficiently loose fit with the piezoelectric elements, the masses and the electrode plate to obviate any substantial damping of ultrasonic vibrations. The transducer may be driven by a circuit comprising a solid state amplifier having input and output connections, a driver transformer having a primary winding connected to such output connection and a secondary winding connected to the electrodes of the piezoelectric transducer, a feedback transformer having a secondary winding connected to such input connection of the amplifier, and a primary winding connected to such electrodes through a phase shifting circuit.

11 Claims, 10 Drawing Figures

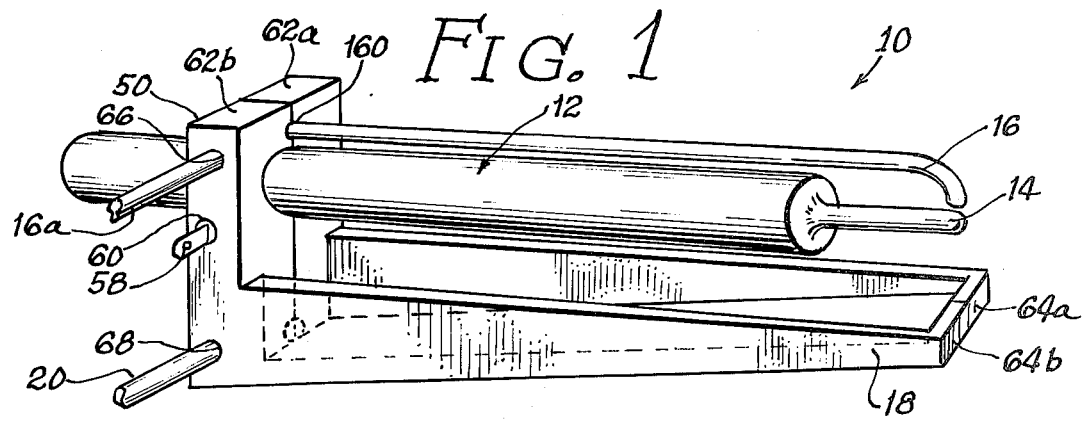
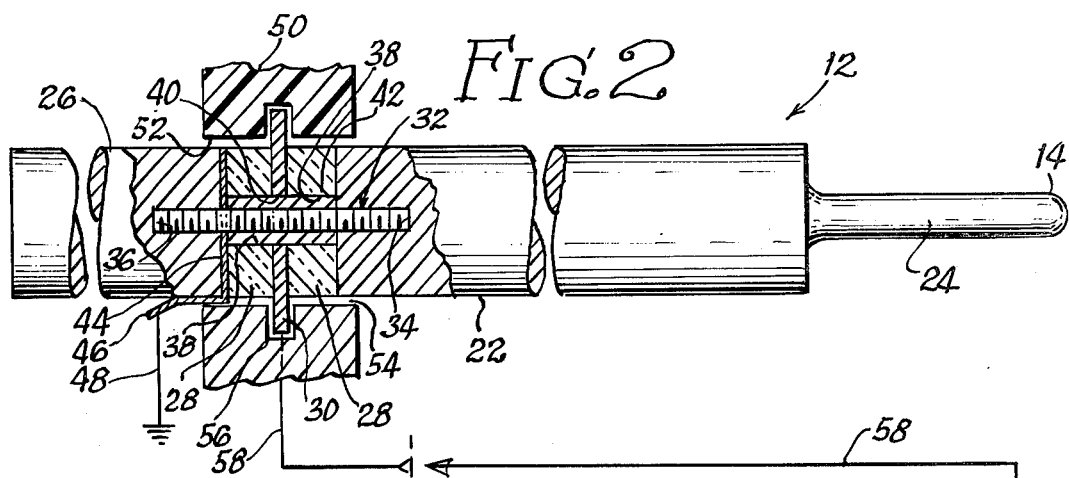
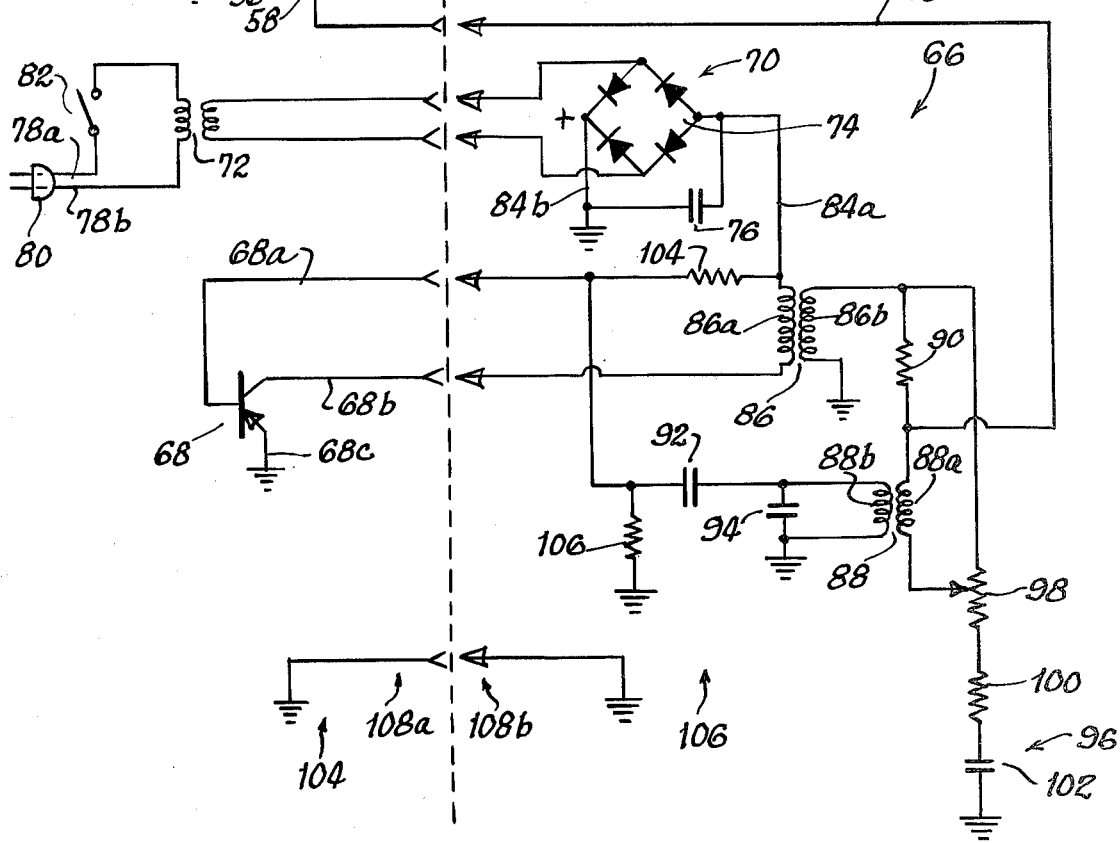

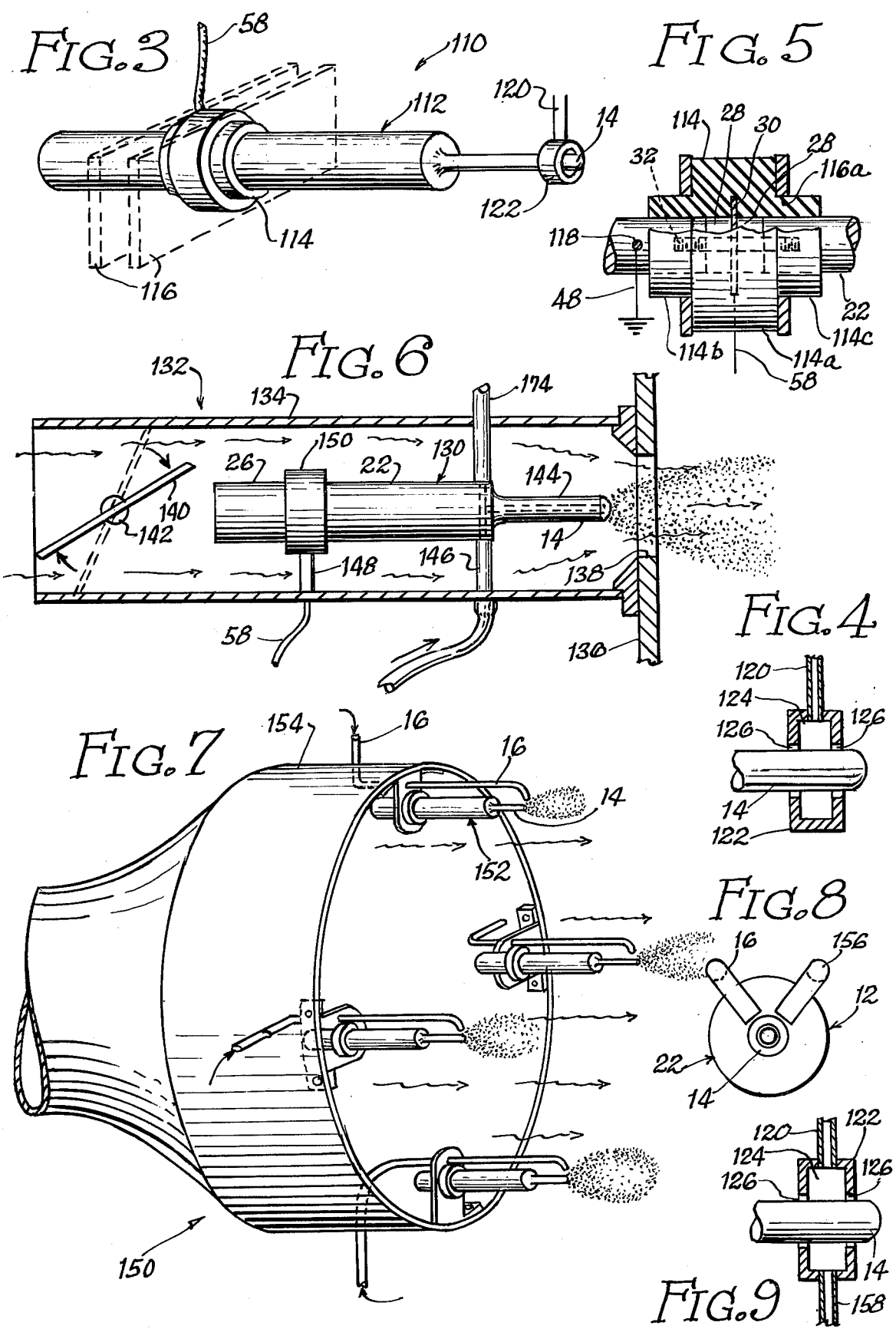

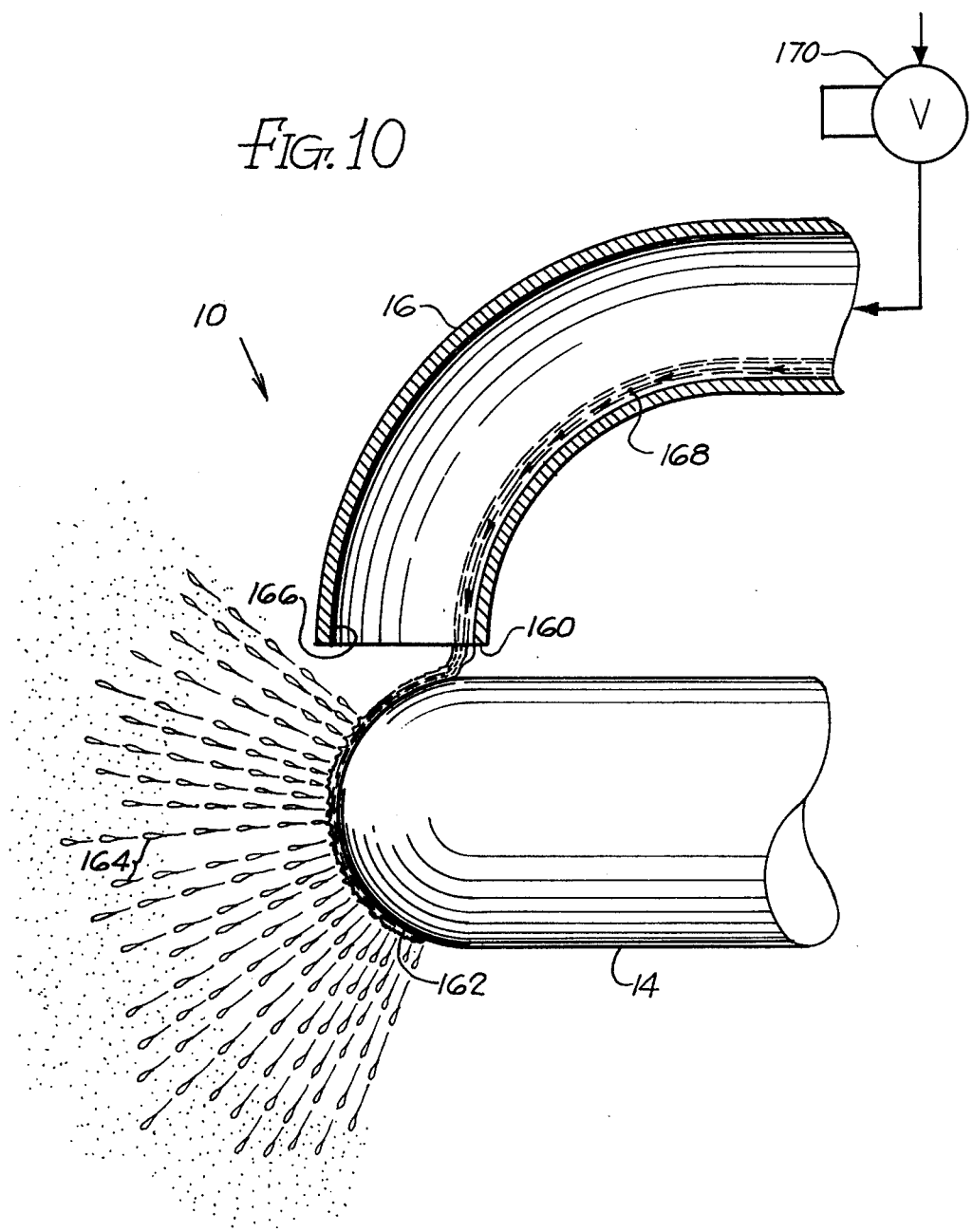

ULTRASONIC HUMIDIFIERS, ATOMIZERS AND THE LIKE

This application is a continuation-in-part of the applicant's copending application Ser. No. 525,487, filed Mar. 20, 1974, now abandoned.

This invention relates to ultrasonic humidifiers, atomizers and the like, adapted to atomize water, gasoline and other liquids, so as to produce a large number of extremely small particles of the liquid.

One object of the present invention is to provide a new and improved atomizer, humidifier, or the like, which is constructed in a new and improved manner so as to utilize ultrasonic vibratory energy to atomize water, gasoline or some other liquid.

A further object is to provide a new and improved device for atomizing liquids with a high degree of efficiency, so as to produce an abundance of extremely small atomized liquid particles.

An atomizer in accordance with the present invention is extremely advantageous for use in a humidifier, in which water is atomized into extremely small particles or droplets, which are rapidly evaporated to increase the level of humidity in the atmosphere around the atomizer, or in an air stream into which the atomized water particles are directed.

In accordance with the present invention, an atomizer may be constructed by providing an ultrasonic transducer having a vibratory member, together with means for producing ultrasonic vibrations thereof, a liquid supply conduit for directing the liquid into contact with the vibratory member, and a collection receptacle disposed below the vibratory member for collecting the liquid when the ultrasonic transducer is not in operation.

The transducer may comprise an elongated front end mass, an elongated tail mass, a pair of piezoelectric elements disposed between such masses, an electrode plate disposed between said piezoelectric elements, means for clamping said masses together with said piezoelectric elements and said electrode plate clamped therebetween, and a mounting member having an opening therein slidably receiving the piezoelectric elements and portions of the masses, such mounting member having an internal peripheral slot within such opening and slidably receiving the electrode plate, the opening and the slot having a sufficiently loose fit with such piezoelectric elements, such masses and such electrode plate to obviate any substantial damping of ultrasonic vibrations.

The transducer may be operated with electrical power supplied by a driving circuit comprising a solid state amplifier having input and output connections, a driver transformer having a primary winding connected to such output connection of the amplifier, and a secondary winding connected to the electrodes of the piezoelectric transducer. A feedback transformer is also provided, having a secondary winding connected to such input connection of such amplifier, and a primary winding connected to the input connection of such amplifier through a phase shifting circuit.

The atomizer of the present invention produces extremely small liquid particles at a rapid rate, with a very low level of power consumption. The atomizer of the present invention is extremely well adapted for use in heating, air conditioning and humidification systems for buildings. The invention is also well adapted for many other uses, such as the atomization of gasoline in a carburetor, and the atomization of water into extremely small droplets which are then converted into snow by a frigid air blast.

Further objects, advantages and features of the present invention will appear from the following description, taken with the accompanying drawings, in which:

FIG. 1 is a perspective view of an ultrasonic humidifier to be described and an illustrative embodiment of the present invention.

FIG. 2 is a fragmentary enlarged sectional view showing the ultrasonic transducer for the humidifier of FIG. 1, while also showing a drive circuit for producing ultrasonic electrical power to energize the transducer.

FIG. 3 is a perspective view showing a modified humidifier.

FIG. 4 is a fragmentary enlarged sectional view taken through the tip portion of the humidifier shown in FIG. 3.

FIG. 5 is an enlarged longitudinal view, partly in section, showing the mounting for the ultrasonic transducer of FIG. 3.

FIG. 6 is a longitudinal section showing a carburetor utilizing an ultrasonic transducer to atomize gasoline, in accordance with the present invention.

FIG. 7 is a fragmentary perspective view showing a device utilizing a plurality of ultrasonic atomizers in a system for producing artificial snow.

FIG. 8 is a front view of a modified atomizing device which is somewhat similar to the device shown in FIG. 1, but makes provision for atomizing a plurality of liquids.

FIG. 9 is a view similar to FIG. 4, but showing another modified construction for atomizing a plurality of liquids.

FIG. 10 is a fragmentary enlarged side elevation, corresponding to a portion of FIG. 1, the view being partly in longitudinal section.

As just indicated, FIG. 1 illustrates an ultrasonic humidifier 10 which can also be used for atomizing liquids other than water. The humidifier 10 comprises an ultrasonic transducer 12 including a vibratory member 14, together with means for imparting ultrasonic vibrations to such vibratory member.

The humidifier 10 also includes means for supplying water or some other liquid to the vibratory member 14. When the water comes into contact with the vibratory member 14, the ultrasonic vibrations thereof cause the water to be broken up into a large number of extremely small particles or droplets which are propagated away from the vibratory member 14. The droplets rapidly evaporate so as to increase the humidity of the atmosphere around the vibratory member 14.

In this case, a tube or pipe 16 is provided to direct the water or other liquid to the outside of the vibratory member 14. The end of the tube 16 comes close to the vibratory member 14 but is preferably spaced therefrom. Preferably, the end of the tube 16 is close to the vibratory member 14 so that the water or other liquid will move into contact with the vibratory member. It is not necessary to rely upon gravity to move the liquid into contact with the vibratory member, because it has been found that the liquid will travel upwardly by capillary attraction to the vibratory member, if the end of the supply tube 16 is close to the vibratory member so that the meniscus of the liquid comes into contact with the vibratory member. During normal operation of the humidifier 10, all of the water supplied by the tube 16 is atomized to form a cloud of extremely small water droplets. However, to collect the water when the vibratory member 14 is not being supplied with ultrasonic energy, a collection receptacle 18 is preferably provided below the vibratory member 14. Any unatomized water drops into the receptacle 18, which may be in the form of a pan, tray or trough. Preferably, the receptacle 18 is provided with a drain, which may take the form of a tube or pipe 20.

Additional details of the ultrasonic transducer 12 are shown in FIG. 2. As shown, the vibratory member 14 takes the form of the tip portion of an elongated front end mass 22, which is shown as being made of metal, but may be made of other suitable materials. An illustrated front end mass 22 is generally cylindrical in shape and is circular in cross-section. The front end mass 22 has a front end portion 24 which is reduced in cross-section. The vibratory member 14 is shown as the tip portion of the reduced member 24. The provision of the reduced member 24 greatly intensifies the ultrasonic vibrations of the tip portion 14.

The illustrated ultrasonic transducer 12 also comprises an elongated tail mass 26 which is also preferably cylindrical and circular in cross section. The elongated tail mass 26 is preferably made of metal but may be made of other suitable materials.

Ultrasonic vibratory energy is supplied to the transducer 12 by suitable means, illustrated as comprising one or more piezoelectric elements. In this case, there are two piezoelectric elements 28 which are generally in the form of circular discs or cylinders, disposed between the ends of the front end mass 22 and the tail mass 26. The piezoelectric elements 28 may be made of a piezoelectric ceramic, or any other suitable piezoelectric material. An electrode member 30 is preferably provided between the piezoelectric elements 28. The illustrated electrode member 30 is in the form of a conductive plate or disc, which is preferably made of metal and may be circular in shape. The piezoelectric elements 28 and the electrode plate 30 are preferably clamped between the front end member 22 and the tail member 26. Such clamping may be produced by a screw member 32, which may take the form of a threaded rod or stud, screwed into tapped axial openings 34 and 36, formed in the front end mass 22 and the tail mass 26. The electrode plate 30 is clamped between the piezoelectric elements 28.

To afford clearance for the clamping screw 32, an axial opening 38 is preferably formed in each of the piezoelectric elements 28. An axial opening 40 is also formed in the electrode plate 30.

Electrical insulation is preferably provided between the axial screw 32 and the electrode plate 30. As shown, such insulation takes the form of a tubular insulating sleeve or bushing 42, mounted around the screw 32, and received within the openings 38 and 40.

In this case, the front end mass 22 is made of conductive material and serves as an electrode to engage one of the piezoelectric elements 28, on the opposite side thereof from the side engaged by the electrode plate 30. The screw 32 provides an electrical connection between the front mass 22 and the tail mass 26. While the tail mass 26 is made of conductive material and could serve as an electrode to engage the other piezoelectric element 28, a thin metal electrode 44 is provided in this case between the tail mass 26 and the adjacent piezoelectric element 28. Electrode 44 may be made of copper foil or any other suitable conductive material. The thin metal electrode 44 makes it easy to establish an electrical connection to the masses 22 and 26. Thus, the illustrated electrode 44 has a terminal tab or projection 46 which is brought out from the main body of the electrode 44, to a point which is readily accessible, so that a lead 48 can readily be soldered or otherwise connected to the terminal tab 46.

The transducer 12 of FIGS. 1 and 2 includes a mounting member 50 which supports the masses 22 and 26, the piezoelectric elements 28 and the electrode plate 30. The mounting member 50 may be made of plastic material, such as nylon, for example, a soft resilient material, such as silicone rubber, or any other suitable material. It is preferred to employ an electrically insulating material, because of the need for insulating the electrode plate 30 from the front and tail masses 22 and 26.

As shown in FIG. 2, the mounting member 50 is formed with an opening 52 which slidably receives portions of the masses 22 and 26, while also receiving the piezoelectric elements 28 and the electrode plate 30. In FIG. 2, a definite clearance 54 is shown between the inside of the opening 52 and the outer surfaces of the masses 22 and 26 and the piezoelectric elements 28. This clearance 54 is exaggerated for clarity of illustration. It is desired to provide a sliding fit between the opening 52 and the masses 22 and 26, as well as the piezoelectric elements 28, so as to prevent the mounting member 50 from causing undue damping of the ultrasonic vibrations produced by the piezoelectric elements 28 and transmitted to the masses 22 and 26. The provision of the clearance or sliding fit also prevents the development of any buzzing noises, so that the ultrasonic transducer operates without producing any audible sounds. The ultrasonic vibrations themselves are far above the audible range.

The illustrated mounting member 50 is formed with a slot 56 for receiving the electrode plate 30. As illustrated, the slot 56 is in the form of an internal peripheral groove, formed in the mounting member 50 within the opening 52. The slot 56 is shown in FIG. 2 as being large enough to afford definite clearance between the electrode plate 30 and the walls of the slot 56, such clearance being somewhat exaggerated for clarity of illustration. It is desirable to provide a sliding fit between the slot 56 and the electrode plate 30, so as to avoid undue damping of the ultrasonic vibrations.

The retention of the electrode plate 30 in the slot 56 prevents any substantial longitudinal movement of the transducer 12 relative to the member 50, so that the transducer 12 is supported in the desired position. As shown, a lead 58 is soldered or otherwise connected to the electrode plate 30 and is brought out of the mounting member 50 through an opening 60 therein.

As shown in FIG. 1, the mounting member 50 may be made in two complementary parts or halves 62a and b which may readily be fitted around the masses 22 and 26 and the piezoelectric elements 28, so as to facilitate the assembly of the transducer 12 within the opening 52 in the mounting member 50. When the halves or parts 62a and b are separated, it is easy to insert the electrode plate 30 into the groove or slot 56.

In the construction of FIG. 1, the collecting receptacle 18 is formed integrally with the mounting member. Thus, the collecting receptacle 18 is also made in two components or halves 64a and b. The components 62a and b and 64a and b may readily be molded from a suitable resinous plastic material, such as nylon, for example.

The liquid supply pipe 16 is connected to a side pipe 16a which is brought out of the mounting member 50 through an opening 66. Similarly, the drain pipe 20 is brought out of the receptacle 18 through an opening 68 which may be caulked or sealed to prevent leakage of the liquid.

The two halves 62a and b of the mounting member 50 may be cemented, bonded, or otherwise secured together. Likewise, the two halves 64a and b of the collecting receptacle 18 may be similarly joined together.

Generally, the tail mass 26 has a length corresponding to approximately one-quarter the wavelenth of the ultrasonic vibrations as propagated in the tail mass. The front end mass 22 generally has a length corresponding approximately to three-quarters of a wavelength of the ultrasonic vibrations, as propagated in the front end mass 22. The reduced end portion 24 generally has a length corresponding approximately to one-quarter wavelength. The ratio between the cross-sectional areas of the front end mass 22 and the reduced portion 24 may be approximately 7 to 1.

The transducer 12 is caused to produce ultrasonic vibrations by applying an alternating or pulsating electrical voltage between the electrode plate 30 and the masses 22 and 26, on opposite sides of the twin piezoelectric elements 28. The electrical voltage should have a frequency which is at or near the resonant frequency of the transducer 12.

FIG. 2 shows an illustrative driver circuit 66 for supplying an alternating electrical voltage to energize the transducer 12. The illustrated driver circuit 66 operates as a self-excited oscillator, comprising an amplifier 68 with feedback to produce sustained oscillations. The amplifier 68 has an input connection 68a, an output connection 68b, and a common connection 68c which serves as the common return terminal for both the input connection 68a and the output connection 68b. The amplifier 68 may be of any suitable type but preferably is of the solid state type, such as a Darlington transistor amplifier, which actually includes a plurality of coupled transistors, but is illustrated as a single transistor for simplicity of illustration. Power to operate the amplifier 68 may be provided by a power supply 70, illustrated as comprising a power transformer 72, a bridge rectifier 74 connected to the output of the transformer 72, and a filter capacitor 76 connected across the output of the bridge rectifier, so as to supply a substantially smooth direct current output. The input of the power transformer 72 may be connected to an alternating current power line by leads 78a and b connected to an electrical plug 80. A switch 82 may be connected in series with either of the leads 78a and b. The direct current output of the power supply 70 appears between leads 84a and b. In this case, the lead 84b is grounded.

The illustrated driver circuit 66 utilizes an output or driver transformer 86 and an input or feedback transformer 88. The transformer 86 has primary and secondary windings 86a and b. Similarly, the transformer 88 has primary and secondary windings 88a and b.

In this case, the primary winding 86a of the output transformer is connected between the power supply lead 84a and the output connection 68b of the amplifier 68. The common connection 68c is grounded.

The secondary winding 86b of the output transformer 86 is connected to the transducer 12. Thus, one side of the secondary winding 86b is connected to the transducer electrode lead 58 through a protective resistor 90. The other side of the secondary winding 86b is connected to ground, and thus is connected to the grounded lead 48 of the ultrasonic transducer 12.

The secondary winding of the feedback transformer 88b is coupled to the input connection 68a of the amplifier 68. Thus, one side of the secondary winding 88b is coupled to the input connection 68a through a coupling capacitor 92. The other side of the secondary winding 88b is connected to ground and thus is connected to the grounded common terminal 68c of the amplifier 68.

As shown in FIG. 2, a capacitor 94 is connected across the secondary winding 88b to form a parallel resonant circuit which acts as a band-pass filter having its center frequency corresponding closely to the resonant frequency of the transducer 12.

One side of the primary winding 88a is shown as being connected to the electrode lead 58 for the piezoelectric elements 28, while the other side of the primary winding 88a is connected to a phase shifting circuit 96. It will be seen that the phase shifting circuit 96 comprises a potentiometer 98, a fixed resistor 100 and a capacitor 102 connected in series across the secondary winding 86b of the driver transformer 86. The primary winding 88a of the feedback transformer 88 is connected between the slider of the potentiometer 98 and the lead 58 extending to the electrode 30 of the piezoelectric transducer 12. The variable potentiometer 98 makes it possible to adjust the magnitude and phase of the feedback voltage which is supplied by the transformer 88 to the input connection 68a of the amplifier 68.

A biasing voltage for the input connection 68a of the amplifier 68 may be provided by a voltage divider, comprising a first resistor 104, connected between the power supply lead 84a and the input connection 68a, and a second resistor 106, connected between the input connection 68a and ground.

In the simplified representation of FIG. 2, the amplifier 68 is represented as a single transistor having its base connected to the input connection 68a; and its emitter connected to the common connection 68c which is grounded. It is preferable to employ a composite transistor amplifier, such as a Darlington amplifier, in which case the input connection 68a is connected to the input base, while the output connection 68b and the common connection 68c are connected to the output collector and emitter.

As shown in FIG. 2, the driver circuit 66 is divided into two modules 104 and 106 which are connected together by disengageable connectors 108a and b. The module 104 includes the power transformer 72, the components 78a, 78b, 80 and 82 in the primary circuit of the transformer 72, and the solid state amplifier 68. The second module 106 includes the other components, such as the bridge rectifier 74, the transformers 86 and 88, the potentiometer 98, and the various other associated resistors and capacitors.

FIGS. 3–5 show a modified atomizer 110 comprising a transducer 112 which is similar to the transducer 12 of FIGS. 1 and 2, except that the transducer 112 has a modified mounting member 114, which may be made of silicone rubber, or some other suitable material, molded around the piezoelectric elements 28, the adjacent portions of the front and tail masses 22 and 26, and the central electrode plate 30. The mounting member 114 is produced by inserting the transducer 112 into a suitable mold, having a cavity corresponding in shape to the desired shape of the mounting member 114, and molding silicone rubber within such cavity and around the transducer 112. In this way, the mounting member 114 is formed with the electrode 30, the piezoelectric elements 28, and the adjacent portions of the masses 22 and 26 embedded in the mounting member 114.

It has been found that when the silicone rubber is cured, it debonds from and shrinks away from the electrode 30, the piezoelectric elements 28, and the masses 22 and 26, so that a small clearance space is produced between the silicone rubber mounting member 114 and the above mentioned components of the transducer 112. The clearance is similar to the clearances 34 and 56 shown in FIG. 2. The clearance spaces become filled with air, which acts as a lubricant between the silicone rubber mounting member 114 and the various components 22, 26, 28 and 30 of the transducer 112, so as to minimize the damping action of the mounting member 114 on the ultrasonic vibrations. The clearance spaces also prevent the development of any buzzing noises so that the ultrasonic transducer operates without producing any audible noise or sound. The ultrasonic vibrations themselves are inaudible.

As shown in FIGS. 3-5, the mounting member 114 has a central generally cylindrical body portion 114a and a pair of generally cylindrical end portions 114b and c of reduced diameter. The mounting member 114 may be supported by confining the body member 114a between a pair of parallel plates 116, made of plastic, metal or other suitable material. The illustrated plates 116 and openings 116a therein for receiving the reduced end portions 114b and c.

Due to the air cushion between the silicone rubber mounting member 114 and the various elements of the transducer 112, there is a sliding fit therebetween which is loose enough to avoid any undue damping of the ultrasonic vibrations.

In this case, the front and tail masses 22 and 26 serve as electrodes on opposite sides of the twin piezoelectric elements 28. The masses 22 and 26 are connected together electrically by the clamping screw 32. The ground lead 48 may be connected to one of the masses 22 by means of a clamping screw 118 tapped into one of the masses 22 or 26. In this case, the clamping screw 118 is mounted on the tail mass 26.

In the atomizer 110 of FIGS. 3-5, the liquid to be atomized is delivered to the tip portion 14 of the transducer 112 by a tube or pipe 120. A shroud or ring 122 is connected to the end of the tube 120 and is disposed around the tip portion 14 to confine the liquid and prevent it from escaping before it is atomized. As shown in FIG. 4, the ring 122 is preferably channel-shaped in cross section. Thus, the illustrated ring 122 has an internal channel or groove 124 into which the liquid is delivered by the tube 120. Annular spaces 126 are provided between the tip portion 14 and the ring 122 to provide for the escape of the atomized liquid particles.

FIG. 6 illustrates another modified atomizer 130 which is shown as applied to a carburetor 132 for supplying atomized or vaporized fuel to an engine, or any other device requiring fuel. The atomizer 130 can be used with gasoline or any other liquid fuel.

As shown, the atomizer 130 is mounted within a conduit or housing 134 through which air is supplied to the engine. The stream of air picks up the atomized fuel and carries it into the intake manifold 136 of the engine. A bolt 138 is provided between the conduit 134 and the intake manifold 136.

A valve plate or other member 140 may be provided in the conduit 134 to regulate the flow of air. As shown, the valve plate 140 is carried by a rotatable control shaft 142 which can be operated manually or automatically to change the position of the plate 140, so as to increase or decrease the flow of air.

In this case, the liquid to be atomized is supplied to the tip 14 of the ultrasonic transducer 130 through an axial passage 144 extending within the front end mass 22. As soon as the liquid emerges from the passage 144, the liquid is atomized by the ultrasonic vibrations of the tip 14. The liquid is supplied to the passage 144 by a laterally extending tube 146 which may extend from a pool of the fuel in a tank, or other container. In most cases, the engine produces an intake suction or vacuum which can be employed to suck the liquid fuel from the container and through the tube 146 and the passage 144. However, the liquid can be delivered under pressure through the tube 146 and the passage 144. If desired, a second liquid, such as water, for example, may be supplied to the transducer 130 through a second tube or pipe 147, leading from a source of such liquid. As shown in FIG. 6, the second supply tube 147 is also connected to the axial passage 144, so that both the first liquid and the second liquid are supplied to the vibratory member 14 through the axial passage.

During the operation of an internal combustion engine, it is often advantageous to supply water to the engine, for the purpose of cooling the engine and increasing the power of the engine, due to the conversion of the water into steam within the engine. If desired, the second liquid supply tube 147 may be arranged to supply the second liquid to the outside of the vibratory member 14.

In this case, the transducer 130 is supported by one or more pillars 148, connected between the wall of the conduit 134 and a mounting member 150 on the transducer 130. The mounting member 150 may be similar to the mounting member 114 of FIGS. 3-5 and may be made of silicone rubber or any other suitable material, molded around the transducer 130. The illustrated pillar 148 is tubular so that the electrode lead 58 can be brought out through the pillar.

FIG. 7 illustrates a device 150 for making snow. Such device 150 utilizes one or more atomizers 152 which may be similar to the atomizer 10 of FIGS. 1 and 2, the atomizer 110 of FIGS. 3-5, or the atomizer 130 of FIG. 6. As illustrated in FIG. 7, the snow making device 150 employs four atomizers 152.

Water is supplied to each of the atomizers 152 through the tube 16, as described in connection with FIGS. 1 and 2, and is delivered to the vibratory tip member. The ultrasonic vibrations of the tip member 14 break up the water into a great many extremely small particles or droplets, which are then converted into snow by a stream of frigid air, supplied by a conduit or pipe 154. The air is sufficiently cold to produce rapid freezing of the atomized water particles. The frigid air may be supplied by a blower and a refrigeration system, connected to the pipe 154.

As shown, the atomizers 152 are mounted on the inside of the air discharge pipe 154, near the end thereof. The atomizers 152 extend beyond the end of the pipe 154. The blast of frigid air from the pipe 154 causes the atomized water particles to be converted into snow, and propels the snow for a considerable distance so that the snow can be distributed as desired. The snow making device 150 is well adapted for producing snow for use on ski slopes.

As illustrated in FIGS. 8 and 9, it sometimes is advantageous to supply a plurality of liquids to the ultrasonic vibratory member 14, so that the liquids will be simultaneously atomized and intimately mixed or emulsified. The modified construction of FIG. 8 is similar to the construction of FIGS. 1 and 2, except that a plurality of tubes are provided to supply a plurality of liquids to the vibratory tip member 14 of the transducer. Specifically, FIG. 8 illustrates a second tube 156, in addition to the tube 16, for supplying a second liquid to the vibratory tip member 14.

The modified construction of FIG. 9 is similar to that of FIGS. 3 and 4, except that a plurality of tubes are connected to the channel-shaped ring member 124 for supplying a plurality of liquids to the vibratory tip member 14. In the specific construction of FIG. 9, a second tube 158 is connected to the ring member 124, in addition to the tube 120. A second liquid may be supplied through the tube 158. The modified constructions of FIGS. 8 and 9 will find many applications. For example, oil and water may be supplied simultaneously to the ultrasonic vibratory member, so that both the oil and water will be atomized simultaneously into a cloud of extremely small droplets. The oil and the water are thus effectively emulsified or intimately mixed. The combined oil and water can be used in many ways. For example, the emulsified mixture of oil and water can be applied to carpet material during the weaving of the material, so that the weaving operation is greatly facilitated.

Due to the provision of a plurality of supply pipes for the liquids, it is easy to regulate the quantities of both liquids, supplied to the vibratory member 14, so that the ratios of the liquids can be adjusted as desired. An atomized mixture of oil and water is extremely useful for various lubrication applications, including stamping and drawing operations, as in the manufacture of single bodied cans by drawing operations.

In the operation of the humidifier 10 of FIGS. 1 and 2, water is caused to flow at a controlled rate through the pipe or tube 16, which directs the water upon the outside of the vibratory tip member 14 on the front end mass 12. Intense ultrasonic vibrations are produced in the vibratory tip member 14 by the piezoelectric elements 28. The vibratory ultrasonic energy breaks up the water flow into a cloud of minute water droplets, each measuring less than one-thousandth of an inch across. In fact, the particle size of the water droplets is typically in the range from 30 to 100 microns. These droplets, being so very small, evaporate almost instantaneously into air at the temperature of a furnace plenum. Thus, the ultrasonic humidifier provides very fast control of the humidity of the air. As soon as the ultrasonic transducer is energized, the cloud of extremely small water droplets is propagated into the air, so that the humidity of the air goes up very rapidly.

The transducer 12 of FIG. 1 may produce ultrasonic vibratory energy at a frequency of 28,000 Hz (cycles per second). The water from the water supply pipe 16 flows over a surface area of the vibratory tip member 14 measuring approximately ½ inch square.

The flowing water forms a thin layer of water on the vibratory member 14. The surface of this layer of water, when subjected to the ultrasonic vibrations, becomes crisscrossed with a grid of ripple waves, which may be referred to as capillary waves, that form a mosaic of wave crests numbering, perhaps, 1,000 per linear inch. The crest of each tiny wave breaks off so that each ripple wave produces an extremely small water droplet which is impelled off the surface of the water with the momentum of the wave crest motion. Thus, for each cycle of the ultrasonic vibrations, as many as one million minute water droplets are impelled off each square inch of the water layer on the vibratory surface. This action is repeated at the frequency of the ultrasonic vibrations, which may be 28,000 cycles per second, for example. The ultrasonic vibratory frequency may actually be varied over an extremely wide range. The ultrasonic transducer 12 is resonant at the vibratory frequency determined by its geometrical design. Due to such resonance, the intensity of the ultrasonic vibrations at the tip 14 is greatly increased.

The atomization of the water or other liquid by the ultrasonic vibrations is extremely efficient. Large volumes of water can be atomized with only a very small amount of ultrasonic power. For example, up to 100 gallons per day of water can be atomized with only 30 watts of ultrasonic power. Accordingly, the operating cost of the ultrasonic humidifier is very low. This is one of the principal advantages of the ultrasonic humidifier.

A further advantage resides in the fact that the ultrasonic humidifier keeps itself clean and free from lime, due to the intense ultrasonic vibrations which are produced by the ultrasonic transducer. The ultrasonic vibrations prevent any lime from adhering to the vibratory transducer. Thus, the ultrasonic humidifier is not subject to the problems of clogging and liming which have been encountered with other types of humidifiers.

Furthermore, the intense ultrasonic vibrations have been found to kill bacteria with high efficiency. Specifically, it has been found that better than a 99% mortality rate is achieved as to any bacteria exposed to the ultrasonic vibrations. Thus, the ultrasonic humidifier has a highly advantageous bactericidal kill action so that the humidified air is purified to a great extent.

If desired, a deodorizing agent may be added to the water which is fed to the ultrasonic humidifier, so that the deodorizing agent will be propagated into the air as the water is atomized. In this way, the ultrasonic humidifier deodorizes the air very effectively. Alternatively, a perfume or other odorizing agent may be added to the water which is supplied to the humidifier, so as to perfume or odorize the air. If desired, the ultrasonic atomizing device may be employed specifically for adding a deodorizing or odorizing agent to the air, without adding water for humidity control. In that case, only the deodorizing or odorizing agent is fed to the ultrasonic transducer.

The ultrasonic humidifier can easily be controlled automatically by an electrical switch system utilizing a humidistat or some other control device, because the operation of the ultrasonic humidifier can be started and stopped, very easily, simply by switching the electrical power to the electronic driver circuit. Thus, the control switch 82 of FIG. 2 may comprise the contacts of the humidistat or other control device. When increased humidity is called for by the control device, the switch 82 is closed. This causes the driver circuit and the piezoelectric elements 28 to produce ultrasonic vibratory energy which immediately causes atomization of the water supplied to the vibratory tip member 14 of the transducer 12.

The ultrasonic transducer 12 is small in size and lightweight. Thus, the ultrasonic humidifier 10 can readily be mounted in any heating or ventilating duct, either horizontal or vertical. The ultrasonic humidifier can be located in a duct which either carries air to or away from the plenum chamber of a furnace. The humidifier can also be located directly in the plenum chamber.

The ultrasonic atomizer can also be used in all other types of humidifiers, such as room type units. Because of the use of solid state electronics, the humidifier is extremely dependable.

The ultrasonic humidifier is well adapted for use in a portable unit for trailers or mobile homes. The humidifier can readily be adapted for use with any collapsible water reservoir.

In fact, the ultrasonic humidifier can be used with any water supply, of any degree of liming or hardness. The humidifier requires very little water pressure, less than one ½ pound per square inch. By using a pressure reducing valve, the humidifier can be used with high water pressures, of 100 pounds per square inch, for example.

Because of the small size and compactness of the ultrasonic humidifier, it can be installed in a very small cut out opening in a duct wall or the like. For example, the opening can be approximately 3 × 4 inches.

The water is supplied to the humidifier by a pipe having a sufficiently large bore to obviate any possibility of clogging. The ultrasonic humidifier does not use nozzles or small pipes which might clog up.

If desired, a plurality of ultrasonic atomizers can be employed in parallel to increase the humidification capacity of the combined system to any desired value. The electronic driver unit of FIG. 2 can be employed to operate a plurality of ultrasonic transducers connected in parallel. In this way, a capacity of at least 100 gallons per day can be achieved with a single electronic driver unit. Generally, the electronic driver unit requires an input power of less than 75 watts.

The ultrasonic humidifier is completely fail safe. In the event of any malfunction of the ultrasonic transducer or driver unit, the water is carried away to the drain.

The electronic driver circuit of FIG. 2 utilizes only a small number of components, comprising a single discrete Darlington amplifier device, two transformers, five resistors, and three capacitors. These components are employed in a novel bridge circuit which provides the essential feedback loop for sustaining the vibratory oscillations of the ultrasonic transducer at its resonant frequency.

The piezoelectric elements 28 of the transducer and the electrode plate 30 are clamped between the front end mass 22 and the tail mass 26 by the axial screw 32. In addition, it is preferred to employ a high temperature epoxy bonding agent to form permanent bonds in all of the joints in this assembly. The front end mass 22 has a step function of a ratio of approximately 7 to 1 on its front end. This construction greatly increases the intensity of the ultrasonic vibrations at the tip of the transducer, where the liquid to be atomized is applied.

The water supply pipe 16 is inserted into an opening 160 formed in the mounting member or shroud 50. The pipe 16 is connected with the side pipe 16a inserted into the opening 66, as shown in FIG. 1. Pipe 16 may be removably connected to the side pipe 16a, as by a screw joint, for example, so that the pipe 16 can easily be removed or replaced.

Each of the halves 62a and 62b of the mounting member or shroud 50 may be molded at low cost in one piece with the corresponding half 64a or 64b of the water collection receptacle 18. The material employed may be a suitable plastic, such as high temperature nylon.

The atomizer 110 of FIGS. 3–5 is operated in much the same manner as the atomizer of FIGS. 1 and 2. The liquid to be atomized is supplied through the pipe 120 to the vibratory tip portion 14 of the transducer 112. The channel-shaped ring 122 is connected to the water supply pipe 120 to confine the liquid to be atomized so that the liquid will be guided into engagement with the vibratory tip member 14. If desired, the liquid can be supplied under increased pressure, because of the provision of the ring 122.

In the atomizer 110 of FIG. 3, the mounting member 114 is preferably made of a high temperature silicone rubber, which has the advantage of being flexible. The silicone rubber may be molded around the piezoelectric elements 28, the electrode 30, the adjacent portions of the masses 22 and 26, and the connecting lead 58.

The ultrasonic atomizers of the present invention are capable of atomizing virtually any liquid. For example, the atomizer is well adapted for atomizing molten metals, to produce extremely small metallic particles which can then be solidified, by an air stream or otherwise, to produce powdered metal. If desired, the atomized droplets of molten metal can be blasted or otherwise propelled, while still molten, upon any desired surface, to metallize the surface.

By way of further example, the ultrasonic atomizer is well adapted for atomizing various paints for use in spray painting. The ultrasonic humidifier produces paint droplets or particles which are extremely small in size. Virtually any liquid coating material can be atomized by the ultrasonic atomizer. Such atomizer is well adapted for use in spray coating substances in which the coating droplets or particles are propelled or controlled by an electrostatic field.

It has been found that the ultrasonic transducers of the present invention are capable of activating various materials or chemical agents. Thus, for example, the ultrasonic vibratory energy developed by the ultrasonic transducer 12 of FIG. 2 is capable of greatly accelerating the bleaching action of bleaching compositions which are employed for bleaching human hair. The vibratory tip portion 14 of the transducer is simly brought close to or into contact with the hair after the bleaching composition has been applied to the hair in the usual manner. The bleaching occurs almost instantaneously when the hair is subjected to the ultrasonic vibratory energy produced at the tip portion 14. The ultrasonic vibrations apparently raise the energy level of the bleaching solution or other compositions so that the bleaching action is greatly accelerated.

If desired, a bleaching solution may be supplied to the tip portion 14 of the transducer, so as to be atomized by the ultrasonic vibrations. However, it is found to be highly satisfactory to apply the bleaching solution in the usual way, by wetting the hair with the bleaching solution, following which the ultrasonic vibratory energy is applied to the hair by the ultrasonic transducer, without the use of the water supply pipe 16. It has been found that the ultrasonic vibrations accelerate the bleaching action of all commercially available oxygen releasing bleaches. The bleaching method of the present invention is applicable to substances generally, but is particularly advantageous as applied to human hair.

It has been found that the ultrasonic transducers of the present invention can be employed very advantageously for removing spots and stains from fabric articles such as clothing or the like. In this method of spot removal, a detergent composition is applied to the spot or stain. Ultrasonic vibratory energy is supplied to the area by bringing the vibratory tip portion 14 of the transducer into contact or close proximity with the spot or stained area. It has been found that the ultrasonic energy activates the detergent composition to a great extent so that the spot or stain is removed. The entire fabric article is generally washed or cleaned following the removal of the spot or stain.

It has been found that the ultrasonic transducers of the present invention may be employed very advantageously for carrying out erasing operations, by mounting an erasing member on the vibratory tip member 14. The erasing member may be made of rubber or any other suitable abrasive material. When the ultrasonic vibratory energy is being supplied to the eraser, it may be lightly applied to the material to be erased, whereupon the erasure is completed almost instantaneously. Thus, even relatively large areas can be erased very quickly and neatly, with not appreciable damage to the paper or other material on which the erasure is carried out.

Those skilled in the art will understand that various values may be assigned to the electrical components shown in FIG. 2. However, it may be helpful to list the following set of values which have been employed successfully in actual practice:

| COMPONENT | VALUE |
|---|---|
| 76 | 1000 microfarads, 50 volts |
| 90 | 100 ohms |
| 92 | .01 microfarad |
| 94 | .033 microfarad |
| 98 | 150 ohms, 12 watts |
| 100 | 1000 ohms, 10 watts |
| 102 | .0056 microfarads |
| 104 | 100,000 ohms |
| 106 | 10,000 ohms |

As shown in FIGS. 1, 8 and 10, the liquid supply pipe or tube 16 has an end or terminal portion 160 which is close to the ultrasonic vibratory member 14. Preferably, the spacing between the end 160 of the supply pipe or conduit 16 is only a minor fraction of the transverse dimension or diameter of the conduit 16. The end 160 of the conduit 16 is preferably so close to the vibratory member 14 that the meniscus of the liquid, emerging from the supply conduit 16, comes into contact with the vibratory member 14, before any drop of the liquid becomes detached from the conduit 16.

The vibratory member 14 is preferably cylindrical in shape and is preferably formed with a spherically curved or hemispherical end surface 162. The end 160 of the supply conduit 16 is preferably positioned opposite the hemispherical surface 162 so that the liquid is delivered from the conduit 16 to the hemispherical surface. It will be seen from FIG. 10 that the end 160 of the supply conduit 16 is spaced a short distance radially and laterally from the hemispherical surface 162. By virtue of this relationship, the water or other liquid, emerging from the conduit 16, spreads over the large or maximum area represented by the hemispherical surface 162. The ultrasonic vibrations of the vibratory member 14 are thus able to atomize the liquid with the maximum efficiency, so that all of the liquid is quickly atomized into a large number of very small droplets 164 which are propelled very rapidly away from the hemispherical surface 162. The size of the droplets 164 is greatly exaggerated in FIG. 10 for clarity of illustration.

As shown in FIG. 10, the end 160 of the liquid supply conduit 16 is preferably cut off along a plane which is parallel to the cylindrical axis of the vibratory member 14, such plane being approximately perpendicular to a radial line extending perpendicular to the cylindrical axis.

The end 160 of the liquid supply conduit 16 preferably has a discharge opening 166 of a large diameter, so that the desired large volume of the liquid to be atomized can be supplied from the conduit 16 to the vibratory member 14 at a low velocity and with a low pressure. With this construction, the liquid flows easily and gently through the large discharge opening 166 to the vibratory member 14 and spreads smoothly over the large hemispherical surface 162 so that the liquid is quickly and completely atomized by the ultrasonic vibrations. None of the liquid bounces or drips from the vibratory member 14. The large discharge opening 166 does not constrict the flow of the liquid, so that the liquid is not squirted or sprayed upon the vibratory member 14, but rather is caused to flow upon the vibratory member in a gentle and controlled manner. The liquid supply conduit 16 preferably has the same internal diameter or transverse dimension as the discharge opening 166, throughout the length of the conduit 16.

As illustrated in FIG. 10, the diameter or transverse dimension of the discharge opening 166 is preferably large enough to be comparable to the diameter or transverse dimension of the vibratory member 14. For example, the liquid supply conduit 16 may be advantageously made of $\frac{1}{4}$ inch copper or other metal tubing, having an internal diameter slightly less than $\frac{1}{4}$ inch, while the vibratory member 14 may have a diameter of about $\frac{3}{8}$ of an inch. These dimensions can be varied and are given merely by way of example.

The spacing between the end 160 of the conduit 16 and the vibratory member 14 may advantageously be from about 1/32 to $\frac{1}{8}$ of an inch, for a conduit size of $\frac{1}{4}$ inch. A typical spacing is about 1/16 of an inch.

If desired, the liquid supply tube or conduit 16 may be made of a resinous plastic material, or any other suitable material.

It is not necessary to rely upon gravity to move the liquid into contact with the vibratory member 14, because it has been found that the liquid will travel upwardly by capillary attraction to the vibratory member, if the end 160 of the supply tube 16 is close to the vibratory member so that the meniscus of the liquid comes into contact with the vibratory member. The capillary attraction of the water or other liquid to the vibratory member 14 is produced by the ultrasonic energy present in the vibratory member. When the ultrasonic energy is present in the vibratory member 14, a substantial attraction occurs due to the capillary waves produced in the liquid by the ultrasonic vibrations. When the liquid supply tube or conduit 16 is sufficiently large and is placed with its end 160 in close proximity to the vibratory member 14, the liquid generally forms a meniscus of the liquid, extending entirely or partially across the discharge opening 166 and bulging slightly therefrom, beyond the end 160. When the ultrasonic energy is supplied to the vibratory member 14, the meniscus of the water or other liquid is drawn or attracted slightly in the direction of the vibratory member, so that the meniscus comes into contact with the vibratory member, even though the meniscus may have been slightly spaced from the vibratory member before the ultrasonic energy was supplied thereto. When the meniscus of the liquid comes into contact with the vibratory member, the capillary forces which produce the attraction of the liquid are substantially increased, so that such forces may be 20 to 50 times the initial force, before contact is established. This increase in the attraction is due to the much more efficient coupling of the sonic energy to the liquid at the contact interface. The greatly increased forces of capillary attraction produce an effective pumping action, so that the water or other liquid is effectively pumped or sucked out of the supply tube 16, to such an extent that the water or liquid stream 168, flowing along and through the supply tube 16, no longer fills the tube, but rather flows along the lower wall portion thereof, as shown in FIG. 10. Thus, the amount of liquid within the supply tube 16 is reduced to a minimum. As rapidly as the liquid is supplied to the tube 16, the liquid is pumped or sucked from the discharge opening 166 at the end 160 of the tube 16.

A control valve 170 may be provided to start and stop the flow of the water or other liquid to the supply tube 16. As illustrated in FIG. 10, the valve 170 may be of the solenoid operated type, or of some other power operated type. A control system may be provided such that the valve 170 is closed, to shut off the liquid, when the ultrasonic energy is turned off. Due to the pumping action of the ultrasonic energy, the amount of liquid in the supply tube 16 is minimized. Thus, there is very little liquid to drain out of the tube 16 when the ultrasonic energy and the liquid are simultaneously turned off. Accordingly, there is very little dripping of the liquid. A meniscus of the liquid will again form on the end of the supply tube 16.

The capillary attraction, due to the ultrasonic energy, produces enough force to lift or draw the water or other liquid upward and out of the supply tube 16, if the supply tube is located below the level of the vibratory member. This means that the supply tube can be located below the vibratory member, and does not have to be positioned above the vibratory member. The supply tube can also be located at intermediate points, opposite the side portions of the vibratory member.

The capillary attraction of the liquid, due to the ultrasonic energy, produces a substantial amount of force, capable of lifting or pumping the liquid several inches upwardly. As long as the liquid which is supplied to the vibratory member is not impeded or restricted by a small constricted passage or orifice, the liquid can be easily pumped.

When the end of the vibratory member is formed with a hemispherical shape, the surface area of the end is increased or maximized, and thus a taper towards the liquid supply tube is provided. Such taper and the hemispherical end surface increase the capillary attraction or pumping of the liquid by providing a larger vibratory area to be in contact with the liquid. The liquid is attracted first to the point at which the tip portion of the vibratory member is closest to the supply tube.

I claim:

1. An ultrasonic device for atomizing a liquid, comprising a front end mass,
a tail mass,
a pair of piezoelectric elements secured between said front end mass and said tail mass for imparting ultrasonic vibrations thereto,
an electrode secured between said piezoelectric elements,
a mounting member having an opening therein receiving said piezoelectric elements and portions of said masses,
said mounting member affording electrical insulation around said piezoelectric elements and said electrode,
said front end mass having a reduced end portion constituting a vibratory member,
a liquid supply conduit mounted on said mounting member and extending to a point adjacent and above said vibratory member for delivering a liquid into contact with said vibratory member,
and a collection receptacle mounted on said mounting member and disposed beneath said vibratory member for collecting any excess liquid draining from said vibratory member.

2. A device according to claim 1, including
a drain conduit connected said collection receptacle for removing the liquid therefrom.

3. A device according to claim 1, in which
said collection receptacle is formed integrally with said mounting member.

4. A device according to claim 1, in which
said mounting member has an additional opening for receiving said liquid supply conduit.

5. A device according to claim 1, in which
said mounting member is split into a plurality of complementary components which are secured together,
said masses and said piezoelectric elements being received between said components.

6. A device according to claim 5, in which
said liquid supply conduit is mounted between said components.

7. A device according to claim 5, in which
complementary portions of said collection receptacle are formed integrally with said complementary components.

8. A device according to claim 1, in which
said collection receptacle is in the form of an open-topped tray projecting forwardly on said mounting member underneath said front end mass and said vibratory member.

9. An ultrasonic device for atomizing a liquid,
comprising a vibratory member,
means for imparting ultrasonic vibrations to said vibratory member,
and a liquid supply conduit for delivering a liquid into contact with said vibratory member for atomization by the ultrasonic vibrations,
said liquid supply conduit having a discharge end disposed with a close spacing constituting a gap between said discharge end and said vibratory member such that the liquid is transferred in a continuous stream across said gap between said liquid supply conduit and said vibratory member,
said liquid supply conduit extending to said discharge end from a level below the level of said vibratory member,
the ultrasonic vibrations of said vibratory member being effective to pump the liquid upwardly along said liquid supply conduit against the force of gravity and also across said gap.

10. An ultrasonic device for atomizing a liquid,
comprising a vibratory member,
means for imparting ultrasonic vibrations to said vibratory member, and a liquid supply conduit for delivering a liquid into contact with said vibratory member for atomization by the ultrasonic vibrations, said liquid supply conduit having a discharge end disposed with a close spacing constituting a gap between said discharge end and said vibratory member such that the liquid is transfered in a continuous stream across said gap between said liquid supply conduit and said vibratory member, said close spacing being less than the transverse dimension of the discharge end of said liquid supply conduit, said liquid supply conduit extending to said discharge end from a level below the level of said vibratory member, the ultrasonic vibrations of said vibratory member being effective to pump the liquid upwardly along said liquid supply conduit against the force of gravity and also across said gap.

11. An ultrasonic device for atomizing a liquid, comprising a vibratory member, means for imparting ultrasonic vibrations to said vibratory member, and a liquid supply conduit for delivering a liquid into contact with said vibratory member for atomization by the ultrasonic vibrations, said liquid supply conduit having a discharge end disposed with a close spacing constituting a gap between said discharge end and said vibratory member such that the liquid is transferred in a continuous stream across said gap between said liquid supply conduit and said vibratory member, said close spacing being less than the protrusion of the meniscus of the liquid as it emerges from said discharge end so that the meniscus engages said vibratory member as the liquid emerges from said discharge end, said liquid supply conduit extending to said discharge end from a level below the level of said vibratory member, the ultrasonic vibrations of said vibratory member being effective to pump the liquid upwardly along said liquid supply conduit against the force of gravity and also across said gap.

* * * * *